United States Patent [19]

Sasaki et al.

[11] 4,424,647
[45] Jan. 10, 1984

[54] WINDOW PANE SUPPORTER IN MOTOR CAR

[75] Inventors: Toshihiro Sasaki; Hiromi Ikehata, both of Toyota; Ryoichi Fukumoto, Nagoya, all of Japan

[73] Assignees: Aisin Seiki Kabushiki Kaisha; Toyota Jidosha Kogyo Kabushiki Kaisha, both of Aichi, Japan

[21] Appl. No.: 243,572

[22] Filed: Mar. 13, 1981

[30] Foreign Application Priority Data

Mar. 17, 1980 [JP] Japan .................................. 55-33576

[51] Int. Cl.³ .............................................. B60J 5/04
[52] U.S. Cl. ....................................... 49/502; 49/377
[58] Field of Search ................... 49/502, 377; 160/11

[56] References Cited

U.S. PATENT DOCUMENTS

| | | | |
|---|---|---|---|
| 2,180,920 | 11/1939 | Churchill | 49/377 X |
| 2,568,811 | 9/1951 | Larsen | 49/377 X |
| 2,782,069 | 2/1957 | Storch | 49/377 |
| 2,854,086 | 9/1958 | Schmidt | 160/11 X |
| 2,876,003 | 3/1959 | Probst | 49/377 X |
| 2,913,783 | 11/1959 | Bright | 49/377 X |
| 4,094,100 | 6/1978 | Fukumoto et al. | 49/377 X |

Primary Examiner—Philip C. Kannan
Attorney, Agent, or Firm—Parkhurst & Oliff

[57] ABSTRACT

According to the present invention, in a window pane supporter in a motor car for supporting a pane at a door belt line portion in a width-wise direction of the vehicle, a cleaning portion for cleaning off undesirable matter attached to the outer surface of the pane when the pane is elevated or lowered is provided at a position upwardly of a supporting portion for supporting the pane in the width-wise direction of the vehicle, so that the inner and outer surfaces of the pane can be firmly supported at the door belt line portion without forming any scratch on the pane surface.

8 Claims, 10 Drawing Figures

WINDOW PANE SUPPORTER IN MOTOR CAR

BACKGROUND OF THE INVENTION

1. Field of the Invention

The present invention relates to a window pane supporter in a motor car, and particularly to a window pane supporter wherein the pane is supported at the door belt line portion of the motor car in a width-wise direction of the vehicle.

2. Description of the Prior Art

In general, in a hard top type motor car with no window frame in a door, as shown in FIG. 1, a pane 2 housed in a door panel 1 is guided by an elevating guide incorporated in the door panel 1 and held in the width-wise direction of the vehicle by a support member 3 provided on a door belt line portion, so that it can obtain the optimum vertical moving path and unusual sounds (pattering sounds of the pane 2) can be prevented from occurring during running condition of the vehicle, or when the door is opened or closed.

FIG. 2 is an explanatory view showing the conventional window pane supporter using the abovedescribed support member 3. The support member 3 rotatably supports a roller 4 as a supporting portion through a pin 5A, and secured to an outer plate 1A and a reinforcing member 1B of the outer phase 1A through a leaf spring 5A. Secured to the outer plate 1A of the door panel 1 is a belt braid 6, which is integrally formed with a weather strip 7 which is in contact with the outer surface of the pane 2.

Additionally, secured to an inner plate 1C of the door panel 1 is a guide member 8 for guiding the pane 2 when it is elevated or lowered, and a guide roller 10, pivoted on a pin 9 fixed to the lower end of the pane 2, is slidably provided on the inner surface of the guide member 8. Further, a bracket 11 is secured to the inner plate 1C of the door panel 1 through bolts and the like in a manner to be movable and adjustable in the width-wise direction of the vehicle. A first mount 12 holds, through a shock absorbing material 12A such as rubber, textile wool consisting of nylon fibers and the like in contact with the inner surface of the pane 2. Fixed on a second mount 13 of the bracket 11 is a trim 14, which is integrally formed with a weather strip 15 being in abutting contact with the inner surface of the pane 2.

More specifically, in the conventional window pane supporter, the pane 2 is supported at the inner and outer surfaces thereof by the roller 4 of the support member 3 and the shock absorbing material 12A and the textile wool 12B, both of which are held on the first mount 12, at the door belt line portion, and the guide roller 10 provided at the lower end portion of the pane 2 is slidably engaged with the guide member 8, so that the pane 2 can be held at the optimum position in the width-wise direction of the vehicle.

However, in the conventional window pane supporter, in order to hold the pane 2 at the optimum position in the width-wise direction of the vehicle and to secure the optimum vertical moving path for the pane 2, it is necessary to support the inner and outer surfaces of the pane 2 firmly. However, under the conditions where undesirable matter such as sand and dust are attached to the outer surfaces of the pane 2, if the pane 2 is firmly supported, scratches tend to be formed on the surfaces of the pane 2 when the pane 2 is elevated or lowered, and hence, a clearance of a certain value is required to be formed between the support member 3 and the pane 2.

With the window glass supporter in which a clearance is rendered between the support member 3 and the pane 2, the pane 2 becomes floatable at the door belt line portion in the width-wise direction of the vehicle, and, when the motor car runs with the pane 2 being slightly lowered into the door panel 1, the pane 2 moves in the width-wise direction of the vehicle, whereby pattering sounds of the pane 2 may occur, and further, the pane 2 may interfere with the door reinforcing members and the like, thereby damaging the quality of the vehicle to a considerable extent. Furthermore, even when the pane 2 is housed in the door panel 1, the pane 2 becomes floatable in the width-wise direction of the vehicle, it becomes necessary to provide clearances of sufficient values between functional parts provided in the door panel 1, such as an outside handle or impact bar, door lock and the pane 2. As a result, there are presented such as disadvantages increased distance between the outer plate 1A and the inner plate 1C, the door panel 1 is increased in weight, and the passenger compartment is decreased in dimensions, thus impairing the comfortability in the vehicle.

SUMMARY OF THE INVENTION

The present invention has been developed in view of the disadvantages of the prior art and has as its object the provision of a window pane supporter in a motor car, in which the inner and outer surfaces of the pane are firmly supported at a door belt line portion without forming scratches on the surfaces of the pane.

To achieve the abovedescribed object, according to the present invention, in a window pane supporter in which the pane is supported at a door belt line portion in the width-wise direction of the vehicle, a cleaning portion for cleaning off undesired matter attached to the outer surface of the pane when the pane is elevated or lowered is provided above the supporting portions for supporting the pane in the width-wise direction of the vehicle.

BRIEF DESCRIPTION OF THE DRAWINGS

The abovementioned features and object of the present invention will become more apparent with reference to the following description, taken in conjunction with the accompanying drawings, wherein like reference numerals denote like elements, and in which.

DETAILED DESCRIPTION OF THE INVENTION

Description will hereunder be given of an embodiment of the present invention with reference to the drawings.

Figure 1:
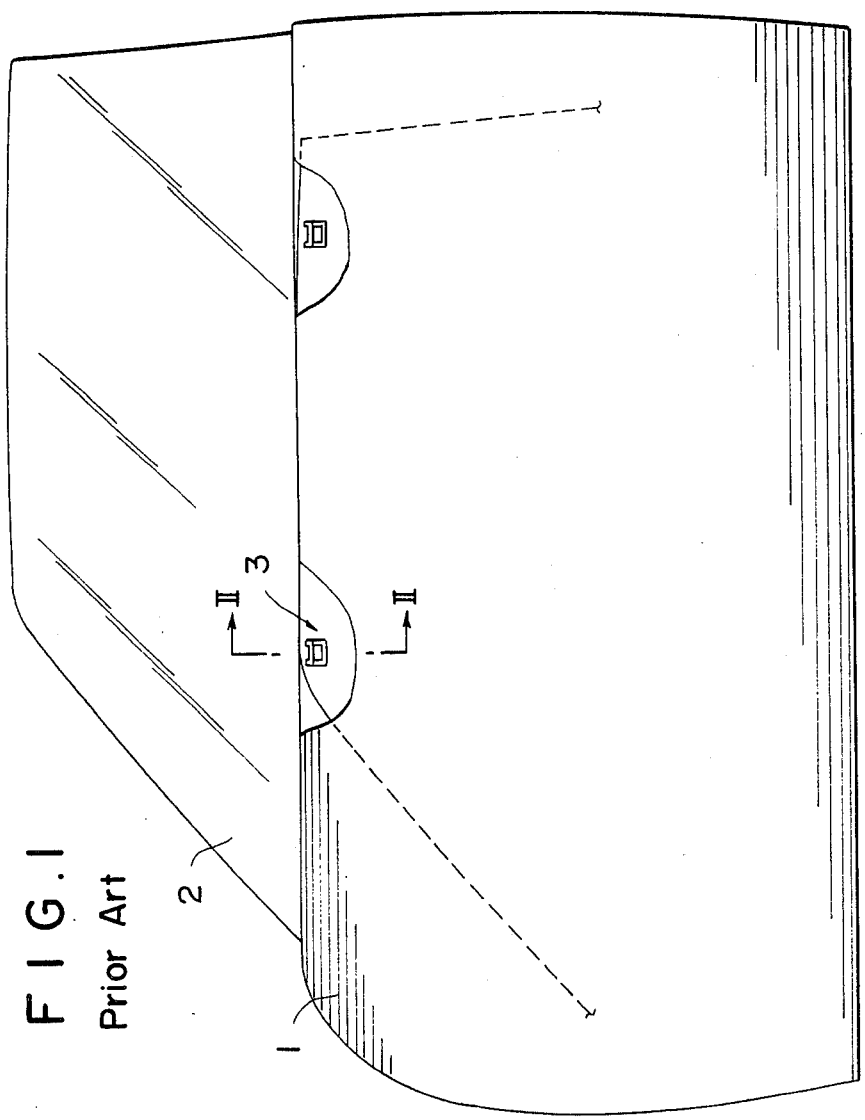
FIG. 1 is a partially broken front view showing the conventional door.
Figure 2:
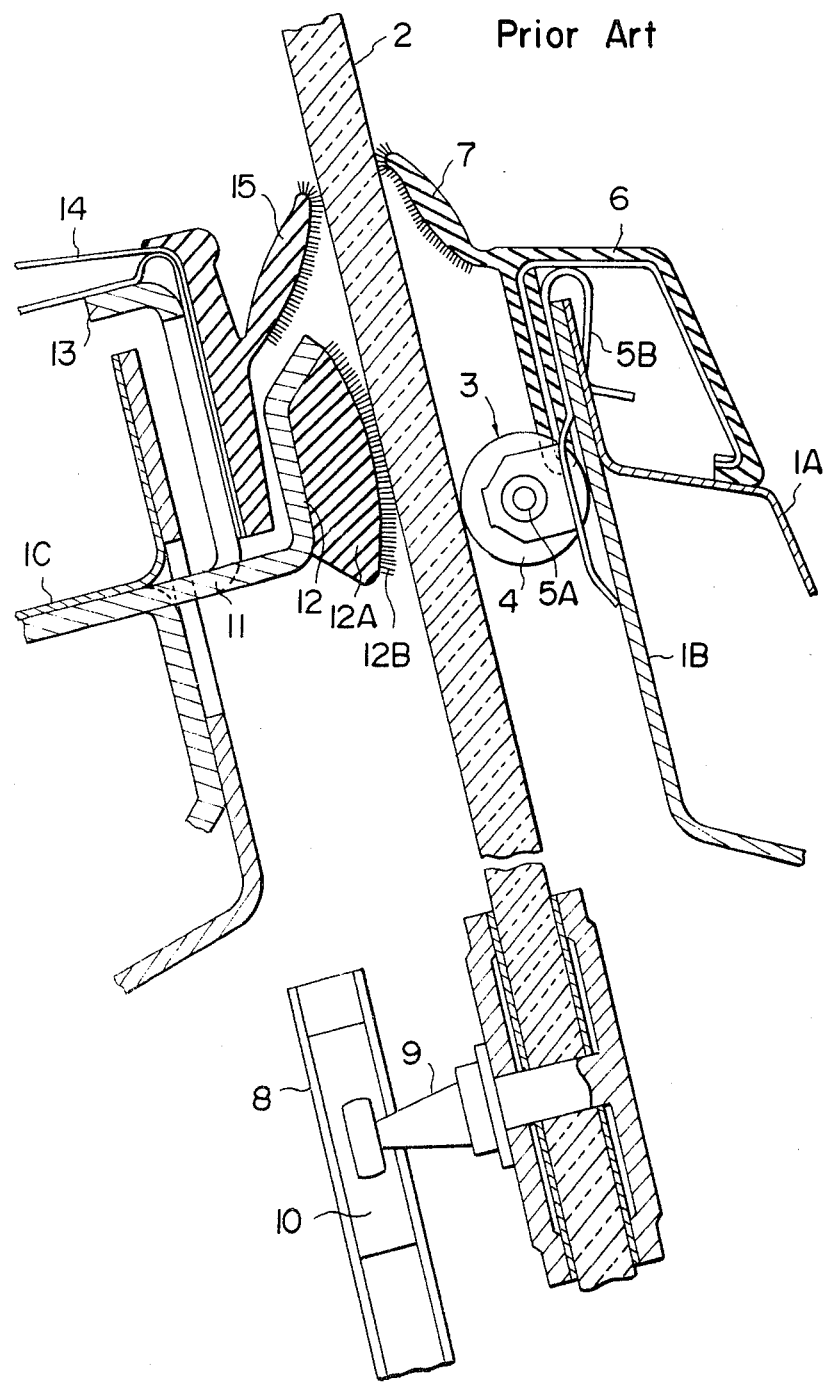
FIG. 2 is a sectional view taken along the line II—II in FIG. 1, showing the window pane supporter in a motor car of the prior art.
Figure 3:
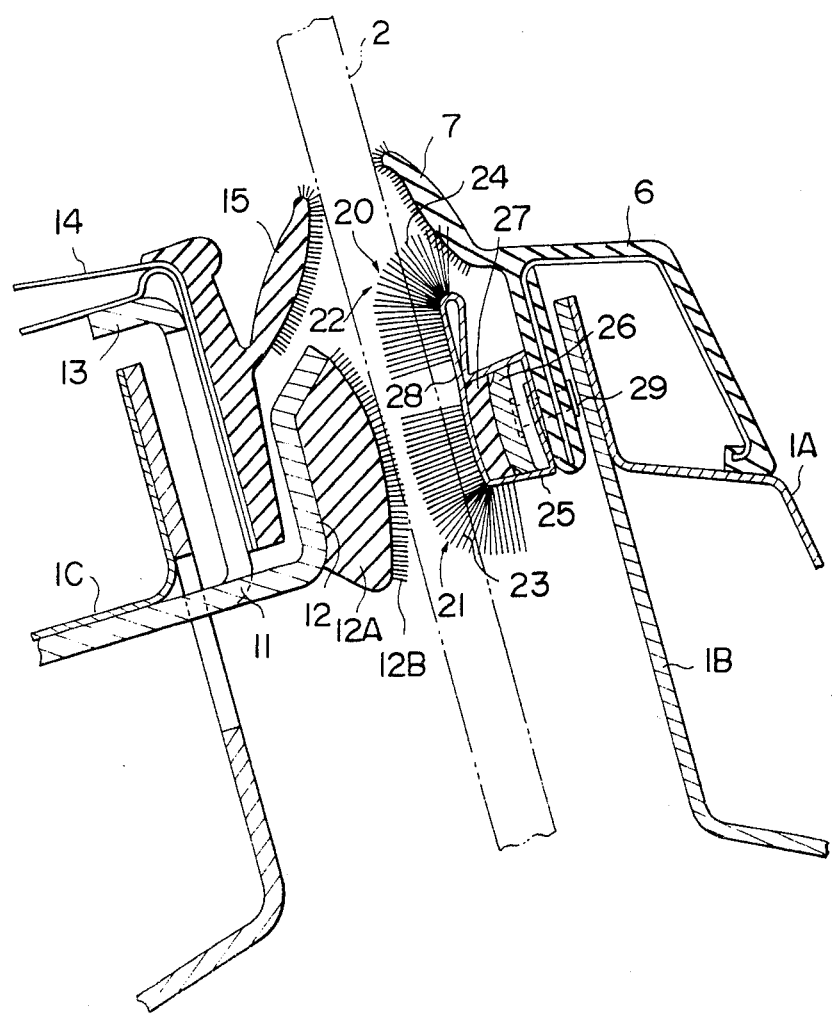
FIG. 3 is a sectional view showing an embodiment of the window pane supporter in a motor car according to the present invention.

FIG. 3 is an explanatory view showing an embodiment of the window pane supporter in a motor car according to the present invention, in which like parts are designated by like reference numerals used in the conventional example shown in FIG. 2, so that detailed description of said like parts can be omitted. A support member 20 for supporting the pane 2 in the width-wise direction of the vehicle is fixed on the belt braid 6 secured to the outer plate 1A at the belt line portion of the door panel. The support member 20 includes a supporting portion 21 being in contact with the outer surface of the pane 2 for supporting the pane in the width-wise direction of the vehicle and a cleaning portion 22 located above the supporting portion 21 for cleaning off undesired present on the outer surface of the pane 2 matter such as sand and dust, when the pane 2 is elevated or lowered. A woven textile 25, into which is woven textile wool 23 of the supporting portion and textile wool 24 of the cleaning portion, both of which consists of spun yarns or filament yarns, surrounds the mounting plate 26 and a shock absorbing material 27 made of felt, rubber or the like fixed on the mounting plate 26 by means of a bonding agent or the like, to thereby form a touch receiving portion for the supporting portion 21. The woven textile 25 extends upwardly from the supporting portion 21 to the side of the cleaning portion 22, and is then connected to the side of the supporting portion 21 located below the cleaning portion, to thereby form a loop. Here, the supporting portion 21 of the support member 20 and the cleaning portion 22 are distinctly separated from each other by a seam portion 28 where opposite ends of the woven textile 25 overlapping on each other are sewn together. More specifically, the seam portion 28 consists of the area between the cleaning portion 22 and the supporting portion 21 where no textile wool is provided. This arrangement prevents the resilient force of the woven textile 25 from being decreased due to the presence of textile wool, and allows the textile wool 24 of the cleaning portion 22 to be in low pressure contact with the outer surface of the pane 2 so that undesired matter present on the outer surface, such as sand and dust, can be removed upon raising or lowering of the window without forming scratches on the pane surface 2. In the drawing, designated at 29 is a rivet for connecting the mounting plate 26 to the belt braid 6 and fixing the support member 20 to the outer plate 1A of the door panel 1. Furthermore, as the textile wool 23 used in the supporting portion 21, it is desirable to use a material low in friction coefficient such as Teflon fibers so that the textile wool can come into firm contact with the pane surface, and yet, can reduce sliding friction on the pane surface. Additionally, according to the experiments of the present inventor, satisfactory results are obtained when the length of the fiber of the textile wool 24 used in the supporting portion 22 is set at about 4 to 6 mm.

With the window pane supporter in a motor car in the abovedescribed embodiment, the outer surface of the pane 2 reaches the supporting portion 21 after having been cleaned by the cleaning portion 22, whereby no scratches are formed on the glass surface, so that the inner and outer surfaces of the pane 2 can be firmly supported by the cooperative actions between the supporting portion 21, the shock absorbing material 12A and the textile wool 12B. Also, rattling sounds and pattering sounds of the pane 2 at the door belt line portion can be prevented from occurring during running of the vehicle, or when the door is opened or closed. Thus a high quality door opening-closing feeling and a more comfortable interior running environment are achieved. Furthermore, it becomes possible for the pane 2 to move on the predetermined optimum vertical moving path; it becomes possible to more properly arrange the functional parts to be secured to the door, door reinforcing member and the like for example; the distance between the outer plate 1A and the inner plate 1C of the door can be minimized; and it becomes possible to lessen the door in weight and improve the comfortability by increasing the space in the compartment. Further, it becomes possible to prevent abutting sounds from occurring due to a collision of the support member 20 with the pane surface when the outer plate 1A and the inner plate 1C are elastically deformed by an inertial force of the pane 2, such as when the door is strongly closed with the pane being half closed, due to the formation of a gap between the support member 20 and the pane surface, and thereafter, the abovementioned deformations are restored to the original states.

In addition, in the abovedescribed embodiment, explanation has been given of the case where the support member 20 is fixed on the belt braid 6 through a rivet 29. However, the support member 20 may be secured to the reinforcing member 1B of the outer plate 1A through a leaf spring for example, or may be fixed by threadable coupling, welding or the like.

Furthermore, in the abovedescribed embodiment, explanation has been given of the case where the mounting plate 26 is separated from the shock absorbing material 27. However, both members may be integrally formed by use of rubber or a hollow resin material.

Figures 4, 5, 6:
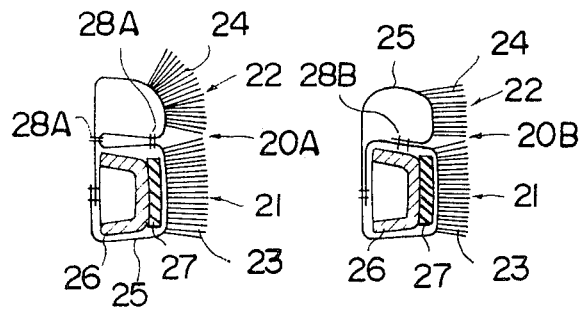
FIGS. 4, 5, 6, 7, 8 and 9 are sectional views showing the modifications of the support member in the embodiment shown in FIG. 3, respectively.

FIGS. 4 through 9 are explanatory views showing the modifications of the support member 20 in the abovedescribed embodiment, respectively. A support member 20A shown in FIG. 4 is constructed such that seam portions 28A are provided at two positions at the bordering portion between the supporting portion 21 and the cleaning portion 22 in the width-wise direction of the vehicle, so that a space surrounded by the woven textile 25 on the side of the cleaning portion 22. With the support member 20A thus formed, the cleaning portion 22 is supported at its back by a large space formed by the woven textile 25, so that the cleaning portion 22 can come into a lower pressure contact with the pane surface.

A support member 20B shown in FIG. 5 is constructed such that a single seam portion 28B is provided at the bordering portion between the supporting portion 21 and the cleaning portion 22 so that the cleaning portion 22 can be supported at its back by a large space formed by the woven textile 25 in the same manner as with the support member 20A shown in FIG. 4. Consequently, with this support member 20B, the number of man-hours in manufacturing can be reduced and the cleaning portion 22 can come into a lower pressure contact with the pane surface in the same manner as with the support member 20A.

As support member 20C shown in FIG. 6 is constructed such that no seam portion is provided on the woven textile 25 between the supporting portion 21 and the cleaning portion 22 and a large space is formed by the woven textile 25 at the back side of the cleaning portion 22. Consequently, with this support member 20C, the number of man-hours in manufacturing can be reduced even further than with the support member 20B, and the cleaning portion 22 can come into an even lower pressure contact with the pane surface than with the support member 20B.

Figure 7:
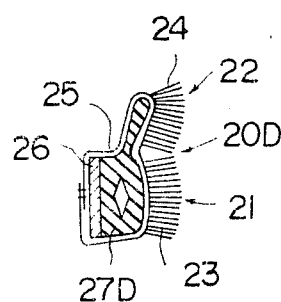

A support member 20D shown in FIG. 7 is constructed such that a shock absorbing material 27D is extended to the cleaning portion 22 beyond the supporting portion 21 and the central portion of the supporting portion being hollow. With this support member 20D, it becomes possible to maintain a contacting force of the cleaning portion 22 on the pane surface in a stabilized condition by means of the resilient force of the shock absorbing material 27D which is created by using the bordering portion between the supporting portion and the cleaning portion of the shock absorbing material 27D as a fulcrum.

Figure 8:
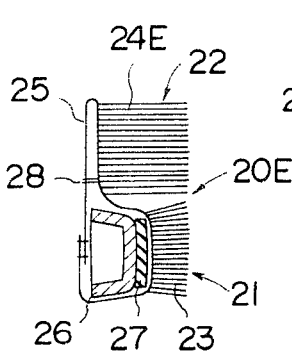

A support member 20E shown in FIG. 8 is constructed such that the fiber length of textile wool 24E provided on the cleaning portion 22 is set at a length of 8 to 10 mm and the seam portion 28 is provided at the border between the supporting portion 21 and the cleaning portion 22. With this support member 20E, the textile wool 24E of the cleaning portion 22 comes into contact with the pane surface not by the resilient force of the woven textile 25 but by a resilient force of the textile wool 24 itself, so that the contact pressure is lower.

Figure 9:
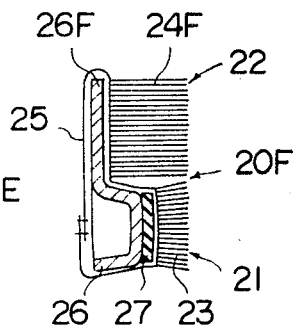

A support member 20F shown in FIG. 9 is constructed such that the fiber length of textile wool 24F provided on the cleaning portion 22 is set at a length of 8 to 10 mm and the mounting plate 26 provided on the side of the supporting portion 21 is extended to the side of the cleaning portion 22. With this support member 20F, the contact pressure of the cleaning portion 22 on the pane surface is decreased and the back surface of the textile wool 24 is reliably secured by a mounting plate 26F.

In addition, in the abovedescribed examples of modifications, explanation has been given of the case where the textile wool on the side of the supporting portion and the textile wool on the side of cleaning portion are provided on a continuous woven textile. However, the woven textile on the side of the supporting portion may be separated from the woven textile on which the textile wool of 8 to 10 mm is provided, or both segments of woven textile may be sewn together to be integrally formed.

Figure 10:
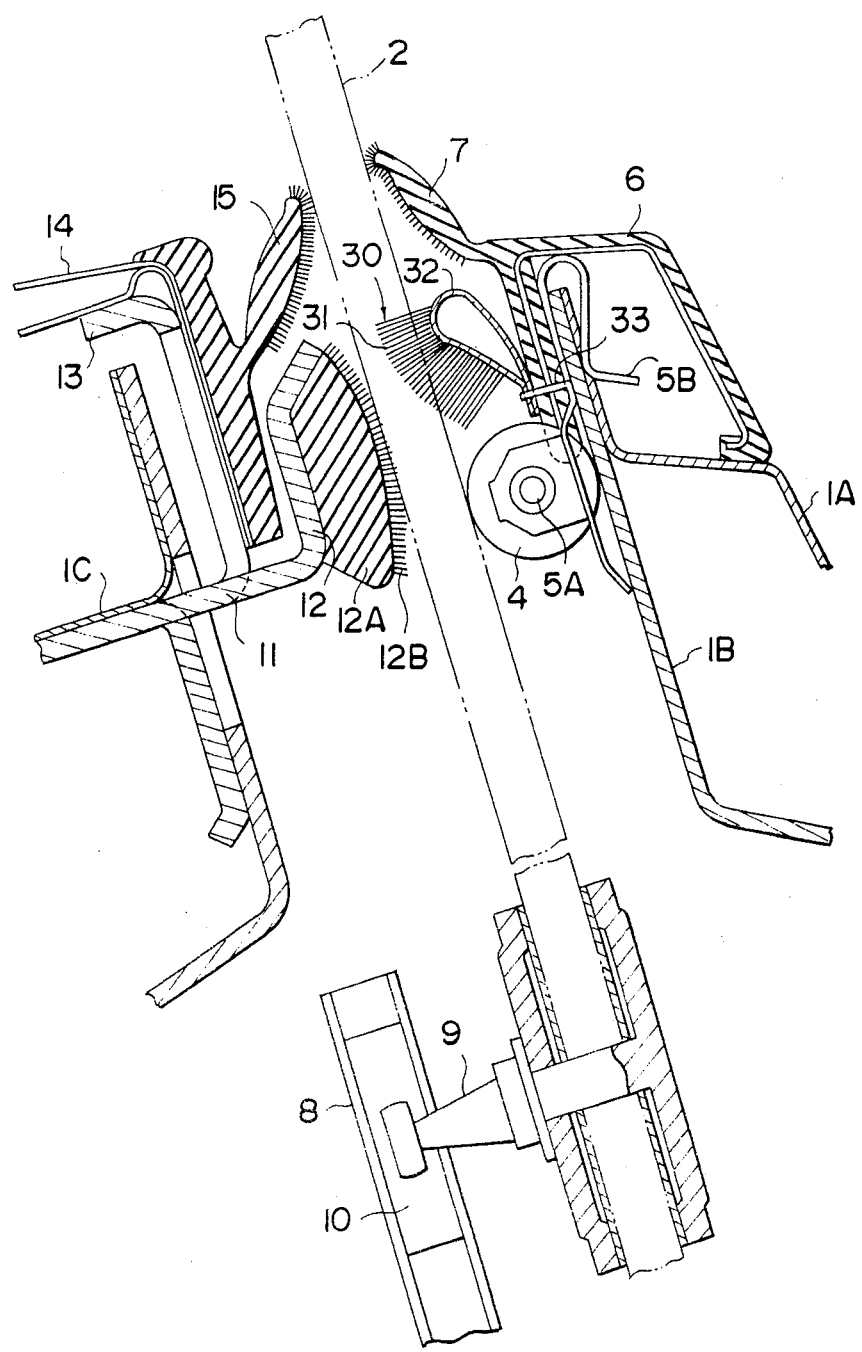
FIG. 10 is a sectional view showing another embodiment of the window pane supporter in a motor car according to the present invention.

FIG. 10 is an explanatory view showing another embodiment of the window pane supporter in a motor can according to the present invention, in which like parts are designated by like reference numerals used in the conventional example shown in FIG. 2, so that detailed description of like parts can be omitted. The difference of the window pane supporter in a motor car in this embodiment from the conventional example as described above resides in that a cleaning portion 30, for cleaning off undesirable matter attached to the outer surface of the pane 2 when the pane 2 is elevated or lowered, is provided at a position above the roller 4, as a supporting portion for supporting the outer surface of the pane 2 in the width-wise direction of the vehicle. The cleaning portion 30 is constructed such that textile wool 31, made of spun yarns or filament yarns, is solidly secured to the surface of the woven textile 32 with a bonding agent or the like and the root portion of the woven textile 32 is fixed to the belt braid 6 with a tacker 33.

With the window pane supporter in a motor car in the abovedescribed embodiment, matter are cleaned off the pane 2 by the cleaning portion 30 when the pane 2 is elevated or lowered. The pane is thereafter supported by the roller 4 on the outer surface of the pane and the shock absorbing material 12A and textile wool 12B on the inner surface of the pane, so that the pane 2 can be firmly supported in the width-wise direction of the vehicle without forming any scratch on the pane surface. Consequently, the floating of the pane 2 at the door belt line portion is controlled, and neither rattling sounds nor pattering sounds occur during running of the vehicle or when the door is opened or closed, and a high quality door opening-closing feeling along with a more comfortable interior running environment are obtained. Furthermore, the pane 2 is prevented from rattling in the door panel 1, so that the functional parts to be secured to the door in the door panel, such as a door reinforcing member or the like, can be more properly arranged and the dimensions of the door can be minimized, so that the door can be lessened in weight and the space in the compartment can be increased.

As has been described hereinabove, according to the present invention, in the window pane supporter in a motor car for supporting the pane at the door belt line portion in the width-wise direction of the vehicle, the cleaning portion for clearing off undersirable matter attached to the outer surface of the pane when the pane is elevated or lowered is provided at a position above the supporting portion for supporting the pane in the width-wise direction of the vehicle, and hence, the present invention can offer such an outstanding advantage that the inner and outer surfaces of the pane are firmly supported at the door belt line portion without forming any scratches on the pane surface.

It should be apparent to one skilled in the art that the abovedescribed embodiments are merely illustrative of but a few of the many possible specific embodiments of the present invention. Numerous and varied other arrangements can be readily devised by those skilled in the art without departing from the spirit and scope of the invention.

What is claimed is:

1. A window pane supporter, in an upper portion of a door of a motor vehicle, for vertically movably supporting the pane in the width-wise direction of the vehicle, comprising:
    weather strips at top portions of an inner plate and outer plate of the door, said weather strips abutting against inner and outer surfaces of the pane;
    a cleaning means elastically supported by the outer plate and lower than said weather strip, said cleaning means including a brush abutting against the outer surface of the pane for cleaning the outer surface of the pane; and
    a support portion lower than said cleaning means for supporting the pane in the width-wise direction of the vehicle.

2. A window pane supporter as set forth in claim 1, wherein said cleaning means is formed of textile wool which is woven into a woven textile.

3. A window pane supporter as set forth in claim 2, wherein said cleaning means is supported by a substantially loop shaped closed portion of said woven textile.

4. A window pane supporter as set forth in claim 2, wherein said cleaning means is supported at its back by a shock absorbing material surrounded by said woven textile.

5. A window pane supported as set forth in claim 2, wherein said woven textile is provided with textile wool for the formation of said supporting portion.

6. A vehicle door window pane mechanism for vertically movably supporting the pane in the width-wise direction of the vehicle comprising:
   (a) a weather strip means located at the top portions of an inner plate and an outer plate of the vehicle door, said weather strip means being in contact with and providing support to the inner and outer surfaces of the pane;
   (b) a support member located below said weather strip means along the outer surface of said pane comprising,
      (i) a woven textile support backing, said support backing surrounding a mounting plate and a shock absorbing material fixed to the inner surface of the mounting plate, said support backing having a substantially loop-shaped upper portion;
      (ii) a textile wool cleaning portion comprising a yarn which is woven into said substantially loop-shaped upper portion of said support backing, said cleaning portion being in low pressure contact with the inner surface of the pane; and
      (iii) a textile wool supporting portion, comprising a yarn which is woven into said support backing and spaced from and below said cleaning portion, said supporting portion being in contact with and providing support to the outer surface of the pane; and
   (c) a resilient textile wool covered shock absorbing member located opposite said support member along the inner surface of said pane for supporting the inner surface of the pane in a width-wise direction of the vehicle so that when the pane is raised or lowered said textile wool cleaning portion removes undesired foreign matter from the surface of the pane, enabling said support member, said weather strip means, and said resilient shock absorbing member to firmly support the pane in the width-wise direction of the vehicle without damaging the surface of the pane.

7. A window pane support member in an upper interior portion of a door of a motor vehicle for use in conjunction with the support of a vertically movable window pane in the motor vehicle, comprising:
   (a) a woven textile supporting backing, said support backing surrounding a mounting plate and a shock absorbing material fixed to the inner surface of the mounting plate, said support backing having a substantially loop-shaped upper portion;
   (b) a textile wool cleaning portion comprising a yarn which is woven into said substantially loop-shaped upper portion of said support backing, said cleaning portion being in low pressure contact with the inner surface of the pane; and
   (c) a textile wool supporting portion comprising a yarn which is woven into said support backing and spaced from and below said cleaning portion, said supporting portion being in contact with and providing support to the outer surface of the pane in the width-wise direction of the vehicle.

8. A window pane support member in an upper interior portion of a door of a motor vehicle, for use in conjunction with the support of a vertically movable window pane in the width-wise direction of the motor vehicle, comprising:
   (a) a vertically extending woven textile support backing having a substantially loop-shaped upper portion;
   (b) a textile wool cleaning portion being secured to said support backing at the upper end thereof, said cleaning portion being in contact with the outer surface of the pane; and
   (c) a textile wool supporting portion, secured to said support backing and spaced from and below said cleaning portion, said supporting portion being in contact with and providing support to the outer surface of the pane in the width-wise direction of the vehicle.

* * * * *